UNITED STATES PATENT OFFICE.

JULIUS KOEBIG, OF SAN FRANCISCO, CALIFORNIA.

DEFECATING CANE-JUICE.

SPECIFICATION forming part of Letters Patent No. 517,820, dated April 3, 1894.

Application filed May 17, 1893. Serial No. 474,545. (No specimens.)

*To all whom it may concern:*

Be it known that I, JULIUS KOEBIG, a subject of the Emperor of Germany, residing in the city and county of San Francisco and State of California, have invented certain new and useful Improvements in Defecating Cane-Juice; and I do hereby declare the following to be a full, clear, and exact description of said invention, such as will enable others skilled in the art to which it most nearly appertains to make, use, and practice the same.

My invention relates to an improved process for the purification of sugar juices, which are obtained from the sugar beet, by which I am able to do away entirely with the carbonic acid treatment, and at the same time produce a larger yield of crystallized sugar and a consequent reduction of the quantity of molasses.

To carry out my improved process I first bring the juice to a boiling heat. I then introduce into it a quantity of magnesium hydrate ($MgO_2H_2$) equal in weight to one-tenth ($\frac{1}{10}$) of one (1%) per cent. of the weight of the beets from which the juice is obtained. The juice is then well stirred. I then add one-third ($\frac{1}{3}$) of one (1%) per cent. of slaked lime together with one-half ($\frac{1}{2}$) of one (1%) per cent. of finely pulverized charcoal, and stir the juice thoroughly and filter quickly. The juice thus obtained I again heat to the boiling point, and then force into it a mixture of one part of sulfurous acid gas ($S.O_2$) and three parts of air, until the juice will show one-tenth ($\frac{1}{10}$%) of one per cent. of alkali. The juice is then again filtered and treated in the usual way. Sugar juices treated in this way will yield ten (10%) per cent. more crystallized sugar than when the carbonic acid treatment is employed. The sugar is of a better quality and the quantity of molasses is greatly reduced. Sugar juices treated by this process and boiled down in a vacuum will yield a solid sugar showing over ninety (90%) per cent. without any separation of crystallized sugar and molasses being necessary.

Heretofore sulfurous acid, alone, has been employed as a bleaching or defecating agent. I have discovered, however, that when the sulfurous acid is mixed with a relatively large proportion of air the oxidizing or bleaching effect is accomplished in a more effectual manner, and with greater economy, since the air performs to a certain extent the same result as would be obtained by sulfurous acid alone.

Having thus described my invention, what I claim, and desire to secure by Letters Patent, is—

The process of purifying sugar juices, consisting, firstly, in adding magnesium hydrate ($MgO_2H_2$) to the boiling juice and stirring the juice; secondly, adding slaked lime and finely pulverized charcoal, stirring and filtering the same; thirdly, again boiling the juice and injecting a mixture of one part sulfurous acid gas and three parts of air into the boiling juice, substantially as described.

JULIUS KOEBIG.

Witnesses:
CHAS. J. ARMBRUSTER,
JAMES C. ADAMS.